July 22, 1941.   J. SLEPIAN ET AL   2,249,866
VAPOR CONDENSING MEANS
Filed March 30, 1939    2 Sheets-Sheet 1
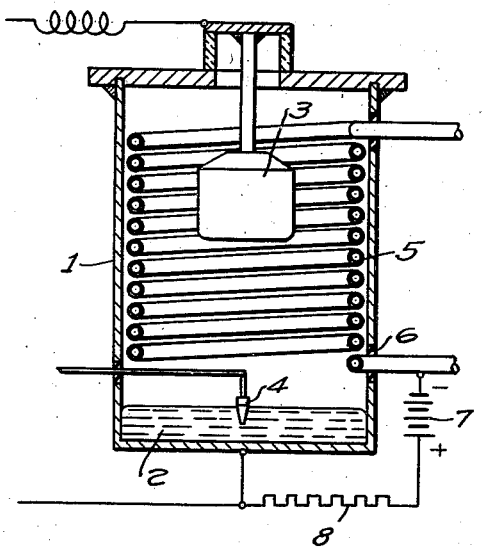
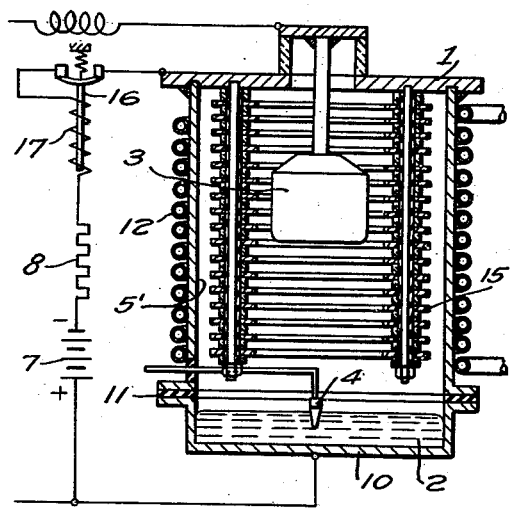
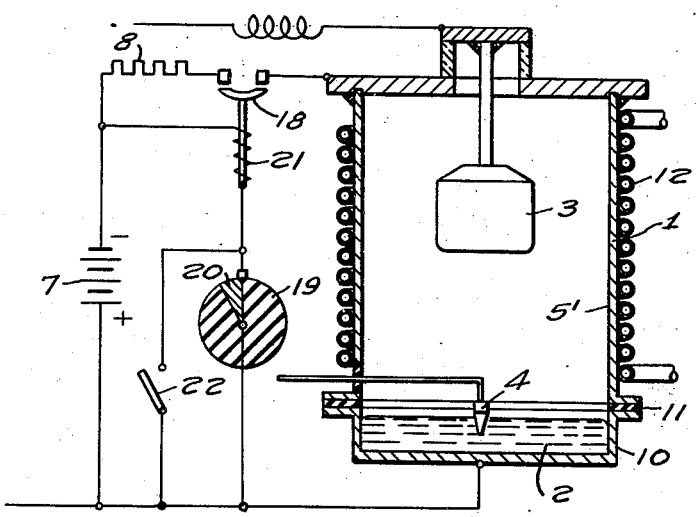
WITNESSES:
INVENTORS
Joseph Slepian, Adolph H. Toepfer,
and Wilson M. Brubaker.
BY
ATTORNEY July 22, 1941.   J. SLEPIAN ET AL   2,249,866
VAPOR CONDENSING MEANS
Filed March 30, 1939   2 Sheets-Sheet 2
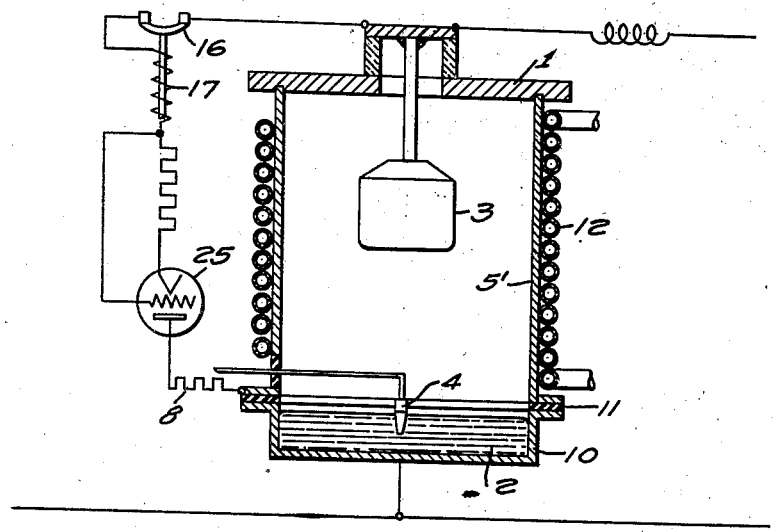
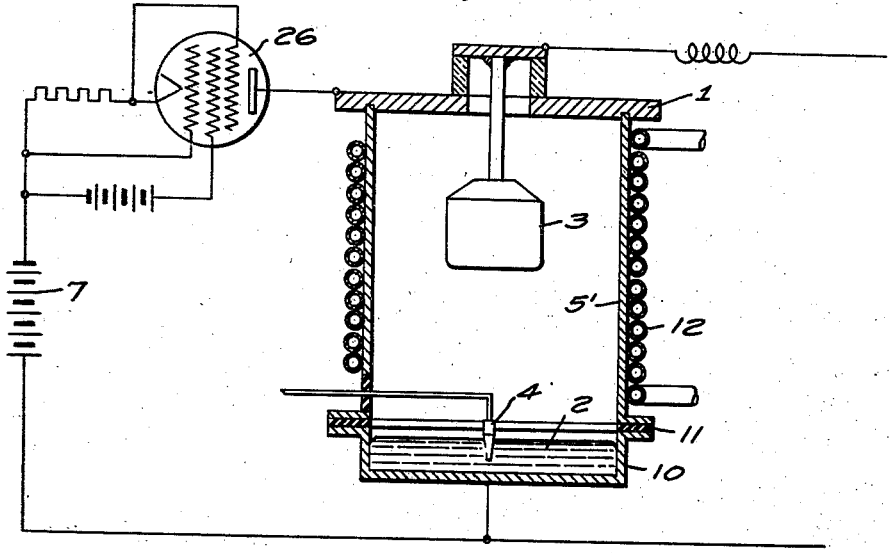
WITNESSES:
E. A. M?Closkey.
Mw. C. Groome
INVENTORS
Joseph Slepian, Adolph H. Toepfer
and Wilson M. Brubaker.
BY
S. A. Strickell
ATTORNEY Patented July 22, 1941

2,249,866

UNITED STATES PATENT OFFICE 2,249,866

VAPOR CONDENSING MEANS

Joseph Slepian, Pittsburgh, and Adolph H. Toepfer and Wilson M. Brubaker, Wilkinsburg, Pa., assignors to Westinghouse Electric & Manufacturing Company, East Pittsburgh, Pa., a corporation of Pennsylvania Application March 30, 1939, Serial No. 264,936

4 Claims. (Cl. 250—27.5)

Our invention relates to a vapor-electric device and particularly to means for maintaining the condensing surface of such devices in efficient operable condition.

It has been discovered that the condensing efficiency of the cooled condensing surfaces of vapor-electric devices is only a small fraction of the heretofore supposed condensing ability. With the usual clean surfaces, it has heretofore been possible to obtain a maximum condensing efficiency of approximately 8% of the calculated condensing efficiency. Even this low percentage is nowise constant, as at times the condensing efficiency falls to a fraction of 1% or even to zero.

It is believed that this loss of condensing efficiency is to a measurable extent responsible for the random occurrence of arc-backs in vapor-electric devices. We believe that this loss of condensing efficiency is probably caused by contamination of the surface with thin films of impurities.

We have found that this loss of efficiency may be corrected by a positive ion bombardment of the condensing surface. This is accomplished, according to our invention, by maintaining the condensing surface at a negative potential with respect to the adjacent discharge, which may be accomplished by maintaining the condensing surface at a negative potential with respect to the cathode. When the condensing surface is at a negative potential the positive ions from the arc space bombard the condensing surface and remove or otherwise eliminate the impediment to the condensing efficiency so that the condensing efficiency of a bombarded condensing surface is several times that of the best condensing surface we have heretofore been able to produce. We have found by experience that after the bombardment has been maintained to a point that the efficiency is at a maximum, the negative potential can be removed and the efficiency of the condensing surface will slowly drop to its normal condition. It is, therefore, possible to conserve energy by temporarily interrupting the supply of potential to the condensing surface.

We have further found that a relatively low bombardment rate will maintain the condensing surface after it has been raised in efficiency and that this low bombardment rate can be secured with a relatively small flow of energy to the condensing surface provided the potential on the condensing surface is not allowed to fall to too low a value. In large current devices, however, the positive ion current to the condensing surface becomes large, much larger than necessary for obtaining the high condensing efficiency, and thus causing unnecessary large energy losses, and encouraging the formation of cathode spots on the condensing surface. The formation of such cathode spots not only may damage the condensing surface, but impairs the desired cleaning effect of the positive ion bombardment by lowering the potential of the surface relative to the discharge. It is possible to reduce the flow of positive ion current to the condensing surface by providing suitable deionizing grids placed between the condensing surface and the arc space. These grids should be relatively open so as not to materially impede the flow of vapor to the condensing surface.

It is, therefore, an object of our invention to provide a vapor-electric device having a condensing surface maintained at a negative potential with respect to the cathode of the device.

It is a further object of our invention to provide a condensing surface having a high condensing efficiency.

It is a further object of our invention to provide means for maintaining the high efficiency of a condensing surface with a low power input thereto.

Other objects and advantages of our invention will be apparent in the following detailed description taken in conjunction with the accompanying drawings in which:

Figure 1 is a sectional elevation of a vapor-electric device according to our invention;

Fig. 2 is a similar view showing the utilization of a deionizing shield for limiting the current flow to the condensing surface;

Fig. 3 is a further modification showing a manner of periodically interrupting the flow of current to the condensing surface;

Fig. 4 is a further modification showing the manner of securing the negative potential from the main anode of the device; and Fig. 5 is a further modification showing a constant current device for regulating the flow of energy from the condenser surface.

The illustrative embodiment of our invention according to Figure 1, is a vapor-electric device having an evacuated container 1 enclosing a plurality of main electrodes one of which is a vaporizable reconstructing cathode 2 preferably of mercury and the other is an anode 3 preferably constructed of graphite.

In order to initiate the arc current between the main electrodes the suitable exciting device herein illustrated a make-alive electrode 4 is provided. The condensing surface 5 is composed of a coil of metal pipe placed within the evacuated container 1 and preferably forming a cylinder surrounding the arc space. This condensing surface 5 is insulated by means of suitable insulators 6 so that the condensing surface 5 may be maintained at a suitable potential by any direct current source herein illustrated as a battery 7 connected between the cathode 4 and the condensing surface 5. In order to regulate the flow of current between the condensing surface and cathode a suitable resistor element 8 is included in the connection between the cathode 2 and the condensing surface 5.

In the illustrative embodiment, according to Fig. 2, the cathode container 10 has been insulated by means of a suitable insulator 11 from the remainder of the evacuated container 1 and the cooling coils 12 are directly applied to the exterior of the container 1 so that the inner surface of the container 1 is the condensing surface 5' of the device. Since this produces a relatively large condenser surface, a material current may be drawn because of the ion flow to the condenser surface. This ion flow may be materially reduced by placing a deionizing screen 15 between the arc space and the condensing surface. Preferably the deionizing grid 15 is insulated both from the condensing surface 5' and the cathode 2, although, if desired, it may be directly connected to the cathode 2. In order to interrupt any undesirable flow of energy to the condensing surface, a suitable current-responsive breaker 16 may be inserted in the connection between the cathode 2 and the condensing surface. This breaker 16 should normally be biased to closed position and have an operating coil 17 in series with the current flow to the condensing surface so that excessive current will momentarily open the breaker 16.

We have found that after the condensing surface has been cleaned by means of ion bombardment, it is possible to interrupt the ion bombardment for short intervals without materially reducing the effectiveness of the surface.

In Fig. 3, we have shown an arrangement for securing periodic application of the negative potential to a condensing surface. A normally open breaker is interposed in the potential connection between the cathode 2 and the condensing surface 5'. A suitable control device for periodically closing this breaker is then provided, herein illustrated as a slowly rotating disc 19 having a small conducting segment 20 which furnishes current to the closing coil 21 of the normally open breaker 18. In certain events it will be desirable to maintain the bombardment over a considerable period of time and this may be accomplished by providing a suitable manually controlled contact device 22 for shorting out the rotating contactor 19 to maintain the normally open breaker 18 in closed position for any desirable length of time.

When it is desired to utilize an intermittent application of current to the condensing surface 5' it is possible to supply the negative potential from the main anode 3 during the negative half-cycle in the device. In this case, the positive ions flowing to the condensing surface are those which are residual or left over from the previous cycle of arcing to the positive main anode. This can be accomplished by connecting the condensing surface 5' to the anode 3 directly, or through a suitable unidirectional conductor 25 which permits current flow only when the main anode 3 is negative. In order to interrupt excessive currents which might damage the conductor 25, a normally closed circuit breaker 16 is provided in this circuit, the operating coil 17 of which is connected in series with the condensing surface 5'.

Instead of using circuit breakers or control grids to control the flow of current to the condensing surface 5', suitable constant current devices may be inserted in the connection between the cathode and the condensing surface. In Fig. 5, we have shown such a device in the form of a pentode tube 26. This tube may be selected of any suitable capacity and will maintain the current flow at substantially this predetermined amount regardless of conditions in the device or at the condensing surface 5'.

For purpose of illustration, we have shown and described specific embodiments of our invention. It will be apparent that many changes and modifications can be made therein without departing from the true spirit of our invention or the scope of the appended claims.

We claim as our invention:

1. A vapor-electric device comprising an evacuated container, a cooled metallic condensing surface in said container, a mercury cathode in said container, an anode cooperating with the cathode, said condensing surface being insulated from said anode and cathode, a source of direct current, circuit means for impressing said direct current between said condensing surface and the cathode whereby the condensing surface is made negative with respect to the cathode and a deionizing grid in shielding relation to said condensing surface.

2. A vapor arc-discharge device comprising a container, a cooled metallic condensing surface in said container, a vaporizable cathode in said container, an anode cooperating with the cathode, said condensing surface being insulated from said anode and cathode, a source of direct current, circuit means for impressing the potential of said source of direct current between the cathode and the condensing surface whereby the condensing surface is made negative with respect to the cathode, a deionizing grid in shielding relation to said condensing surface and means responsive to a predetermined current to said condensing surface for momentarily interrupting said circuit means.

3. An arc-discharge device comprising an evacuated container, a cooled metallic condensing surface in said container, a vaporizable cathode in said container, an anode cooperating with the cathode, insulating means between said anode and cathode and the condensing surface, a source of direct current, circuit means for impressing the potential of said source between the cathode and the condensing surface whereby said condensing surface is made negative with respect to the cathode normally closed circuit interrupting means in said circuit and means responsive to an excessive flow of current to said condensing surface for momentarily opening said circuit interrupting means.

4. A vapor electric device comprising a container, a cooled condensing surface in said container, a vaporizable cathode in said container, an anode cooperating with said cathode, said condensing surface being insulated from said anode and cathode, a source of direct current, circuit means for connecting said source of direct current to said cathode, switching means in said circuit, means for periodically applying the potential of said source to said cathode and said condensing surface and means for limiting the current flow to said condensing surface.

JOSEPH SLEPIAN.
ADOLPH H. TOEPFER.
WILSON M. BRUBAKER.